US012757017B2

(12) United States Patent
Swaminathan

(10) Patent No.: US 12,757,017 B2
(45) Date of Patent: Oct. 6, 2026

(54) PRIVACY PROTECTION IN NETWORK SLICE AS A SERVICE

(71) Applicant: T-Mobile USA, Inc., Bellevue, WA (US)

(72) Inventor: Kavitha Swaminathan, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 111 days.

(21) Appl. No.: 17/966,599

(22) Filed: Oct. 14, 2022

(65) Prior Publication Data

US 2024/0129733 A1 Apr. 18, 2024

(51) Int. Cl.
*H04W 12/06* (2021.01)
*H04W 12/02* (2009.01)
*H04W 12/30* (2021.01)

(52) U.S. Cl.
CPC ......... *H04W 12/068* (2021.01); *H04W 12/02* (2013.01); *H04W 12/30* (2021.01)

(58) Field of Classification Search
None
See application file for complete search history.

(56) References Cited

U.S. PATENT DOCUMENTS 8,255,469 B2 8/2012 Leppanen et al.
8,259,616 B2 9/2012 Mower et al.
8,880,659 B2 11/2014 Mower et al.
10,129,108 B2 11/2018 Vrzic
10,178,646 B2 1/2019 Bosch et al.
10,264,506 B2 4/2019 Faccin et al.
10,382,903 B2 8/2019 Shaw et al.
10,708,143 B2 7/2020 Zhang et al.
10,708,368 B1 7/2020 Young et al.
10,742,522 B2 8/2020 Senarath et al.
10,785,652 B1 9/2020 Ravindranath et al.
10,820,185 B2 10/2020 Faccin et al.
10,863,556 B2 12/2020 Lau et al.
(Continued)

FOREIGN PATENT DOCUMENTS

CN 109586938 B 10/2020
CN 109526032 B 2/2021
(Continued)

*Primary Examiner* — Benjamin E Lanier
(74) *Attorney, Agent, or Firm* — Ashurst Perkins Coie US LLP

(57) ABSTRACT

Systems, methods, and devices that relate to different anonymity levels corresponding to different network slices are disclosed. In one example aspect, a wireless communication system includes at least one core network node and at least one access network node. The core network node and the access network node are configured to provide transport network connectivity to a mobile device for access to multiple network slice instances. The wireless communication system also includes a credential service node configured to authenticate the mobile device for the access to the multiple network slice instances and provide anonymity to the mobile device by generating a first pseudonymous identifier of the mobile device for a first network slice instance of the multiple network slice instances and a second pseudonymous identifier of the mobile device for a second network slice instance of the multiple network slice instances.

20 Claims, 10 Drawing Sheets

(56) References Cited

U.S. PATENT DOCUMENTS

| | | | | |
|---|---|---|---|---|
| 10,986,010 | B2 | 4/2021 | Kodaypak et al. | |
| 11,026,106 | B2 | 6/2021 | Bor-yaliniz et al. | |
| 11,038,972 | B2 | 6/2021 | Lu et al. | |
| 11,115,920 | B1 | 9/2021 | Seetharaman et al. | |
| 11,252,654 | B2 | 2/2022 | Caceres et al. | |
| 2015/0142623 | A1* | 5/2015 | Ferguson | G06F 21/88 705/30 |
| 2017/0367036 | A1 | 12/2017 | Chen et al. | |
| 2018/0041855 | A1* | 2/2018 | Chen | H04L 63/0853 |
| 2018/0310238 | A1 | 10/2018 | Opsenica et al. | |
| 2019/0373520 | A1 | 12/2019 | Sillanpää | |
| 2020/0077327 | A1 | 3/2020 | Duan et al. | |
| 2020/0120721 | A1* | 4/2020 | Lau | H04W 76/11 |
| 2020/0245139 | A1* | 7/2020 | Nakarmi | H04W 12/80 |
| 2020/0259786 | A1* | 8/2020 | Saarinen | H04L 63/0414 |
| 2020/0329381 | A1 | 10/2020 | Chou et al. | |
| 2021/0105656 | A1 | 4/2021 | Estevez et al. | |
| 2021/0211942 | A1 | 7/2021 | Guo et al. | |
| 2022/0014947 | A1 | 1/2022 | Smith et al. | |
| 2022/0021590 | A1 | 1/2022 | Seetharaman et al. | |
| 2022/0086864 | A1 | 3/2022 | Sabella et al. | |
| 2022/0104114 | A1 | 3/2022 | Garcia Martin | |
| 2022/0141738 | A1 | 5/2022 | Chou et al. | |

FOREIGN PATENT DOCUMENTS

| | | | | |
|---|---|---|---|---|
| CN | 112368977 | A | 2/2021 | |
| CN | 109525409 | B | 7/2021 | |
| CN | 109787793 | B | 12/2021 | |
| KR | 20170114923 | A | 10/2017 | |
| KR | 20170119296 | A | 10/2017 | |
| KR | 20180098144 | A | 9/2018 | |
| KR | 102105683 | B1 | 5/2020 | |
| WO | WO-2021254595 | A1 * | 12/2021 | H04L 9/3239 |
| WO | WO-2022252658 | A1 * | 12/2022 | |

* cited by examiner

PRIVACY PROTECTION IN NETWORK SLICE AS A SERVICE

BACKGROUND

Network slicing is a network architecture that enables the multiplexing of virtualized and independent logical networks on the same physical network infrastructure. Built upon the network slicing architecture, Network Slice as a Service (NSaaS) is offered by service providers to customers to provide a variable of services, including Business to Consumer (B2C) services, Business to Business (B2B) services, Business to Household (B2H) services, and Business to Business to Everything (B2B2X) services.

BRIEF DESCRIPTION OF THE DRAWINGS

Detailed descriptions of implementations of the present technology will be described and explained through the use of the accompanying drawings.

Figure 1:
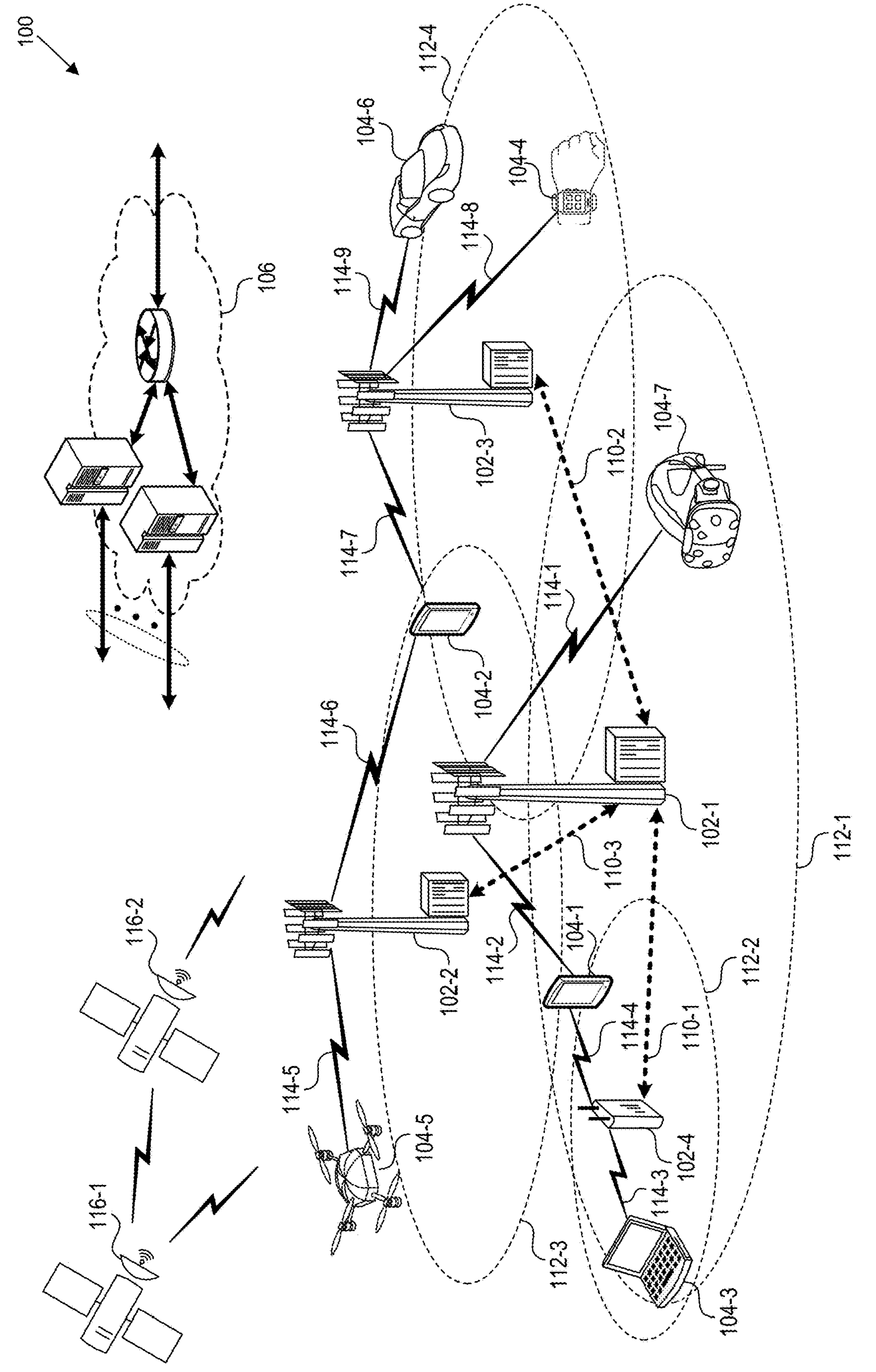
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

User privacy protection, especially protection against malicious tracing of the user usage across networks, is of particular concern in wireless communications. Data footprint across multiple networks can result in more touchpoints for cybercriminals. To enable businesses to better protect user data and comply with regulations, privacy protection based on the NSaaS architecture can be implemented in various embodiments to offer different levels of user anonymity that correspond to different network slices. A credential service can be provided to associate a network slice with a pseudonymous identifier of the user device. Different network slices can correspond to different levels of privacy protection based on configurations of the credential service, such as network slice service types and/or user pricing plans. The privacy protection NSaaS can be implemented using cryptographic technology to avoid unnecessary conveyance of additional user information, such as the permanent unique identifier of a user. The use of the appropriate cryptographic techniques also enables the possibility of separating the provider of the privacy protection service from the network operator.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs, including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), Mobile Broadband (MBB), Vehicle-to-verything (V2X), Machine-to-Machine (M2M), Machine-to-everything (M2X), Ultra-Reliable Low-Latency Communication (URLLC), Machine-Type Communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG) or wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (M IMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
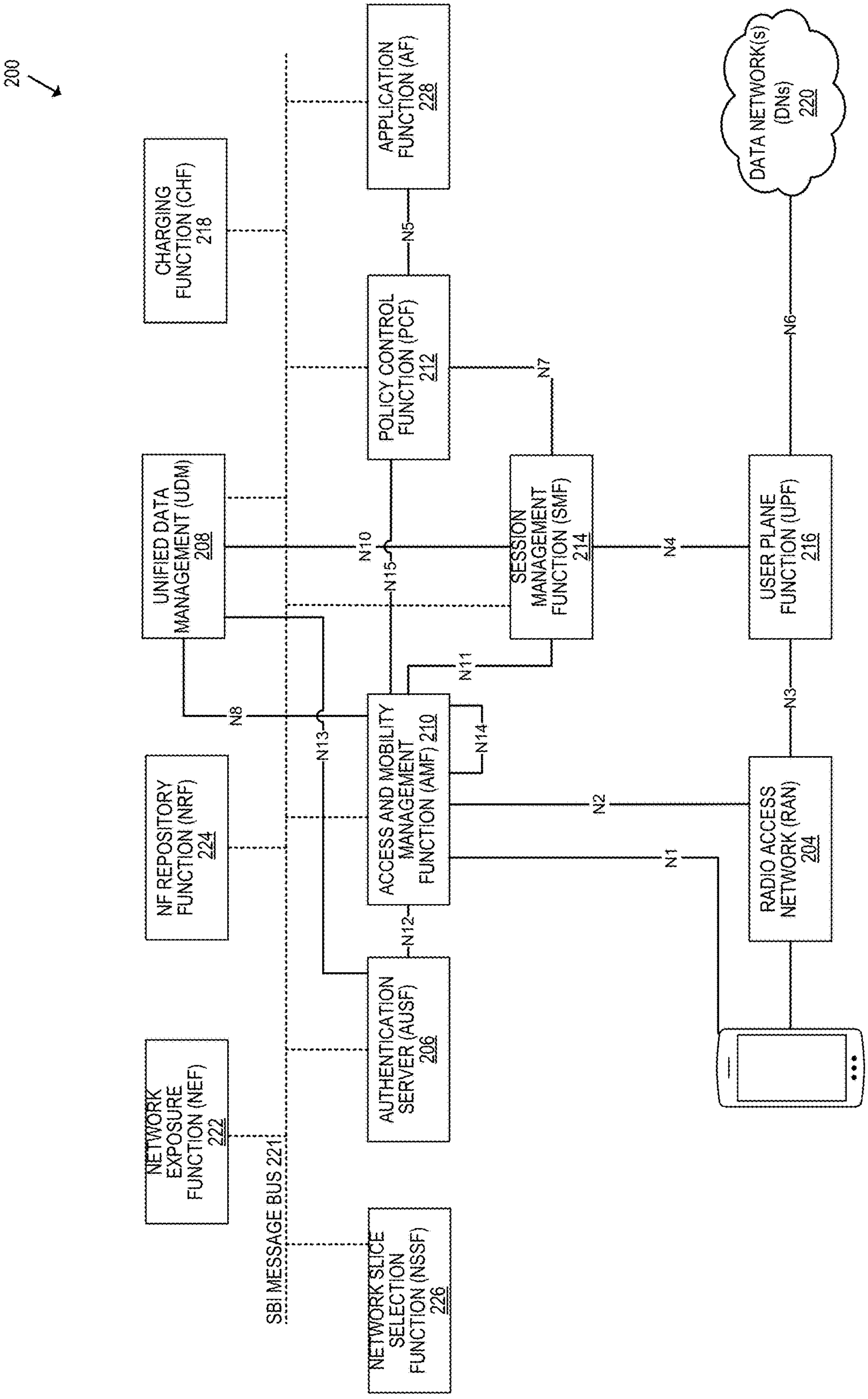
FIG. 2 is a block diagram that illustrates 5G core network functions (NFs) that can implement aspects of the present technology.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions, such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical Quality of Services (QoS) and charging rules, includes network slice selection, which is regulated by the NSSF 226.

Network Slicing

Figure 3:
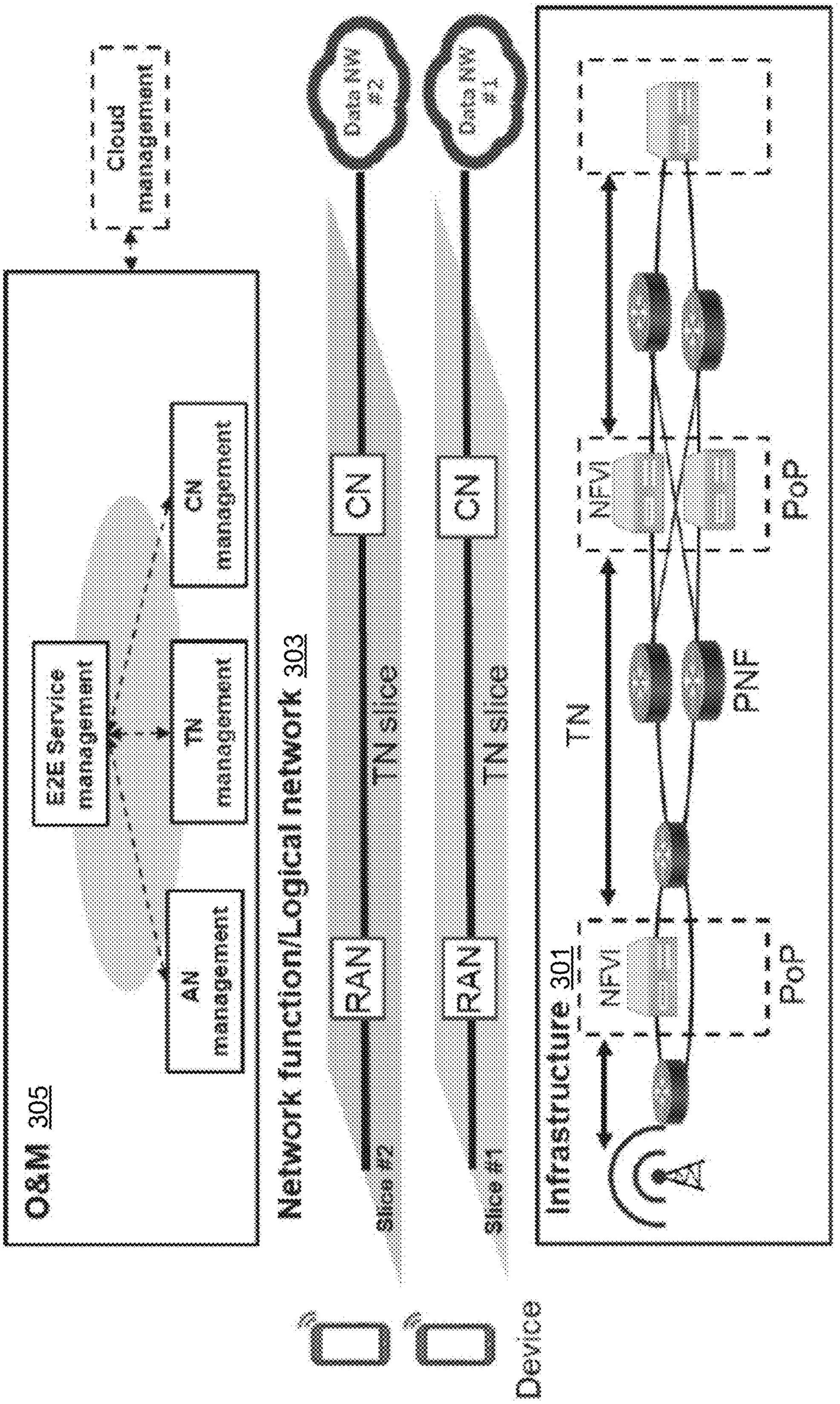
FIG. 3 illustrates an example of network slicing architecture for mobile networks.

The architecture of network slicing enables the multiplexing of virtualized and independent logical networks on the same physical network infrastructure. FIG. 3 illustrates an example of network slicing architecture for mobile networks. The network slicing architecture is structured into different stratums. The stratums include the infrastructure stratum 301, network and application function stratum 303, and Operation and Maintenance (O&M) stratum 305.

The infrastructure stratum 301 compromises hardware and software resources, such as user equipment and/or compute-, storage- and networking-hardware equipment, as well as the services and software programs stored thereof. The infrastructure stratum 301 can be used to implement physical network nodes and/or to define a distributed cloud environment, such as Physical Network Functions (PNFs) and/or the Network Functions Virtualization Infrastructure (NFVI). The network function/logical network stratum 303 includes a collection of PNFs. It provides the user control and application plane functionality across the different network segments, including the RANs, the Transport Network (TN) and the Core Network (CN). The O&M stratum 305 conveys the support and management functionality that allows for the deployment and operation of individual network slices. Each network slice is an isolated end-to-end network tailored to fulfill diverse requirements requested by a particular application.

Figure 4:
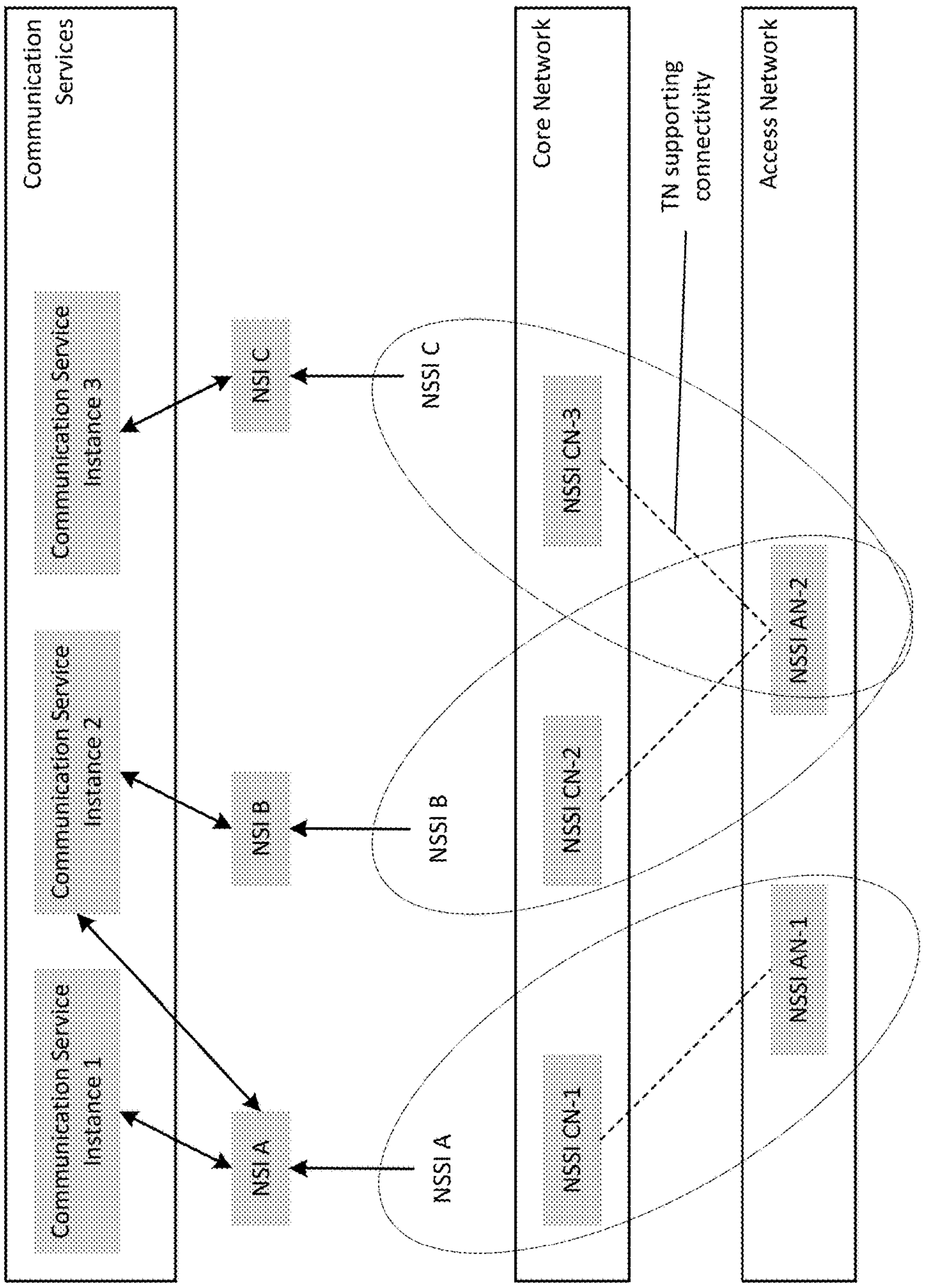
FIG. 4 illustrates an example relationship between instances of Communication Services, instances of Network Slices, and Network Slice Subnet Instances (NSSIs).

In 5G wireless networks, network slicing assumes a central role designed to efficiently embrace a plethora of services with very different service-level requirements. FIG. 4 illustrates an example relationship between instances of Communication Services, Network Slice Instances (NSIs), and NSSIs. In this example, each of NSSI Access Network 1 (AN-1) and NSSI AN-2 includes different sets of instances of AN NFs. NSSI CN-1, NSSI CN-2, and NSSI CN-3 each includes different sets of instances of CN NFs. The TN supporting connectivity facilitates the communication between CN and AN NFs. NSSI A combines NSSI AN-1 with NSSI CN-1 and corresponding TN connectivity. NSSI B combines NSSI AN-2 and NSSI CN-2 and corresponding TN connectivity. NSSI C combines NSSI AN-2 with NSSI CN-3 and corresponding TN connectivity. As shown in FIG. 4, one AN instance (e.g., NSSI AN-2) can be shared between different NSSIs (e.g., NSSI B and NSSI C). In some embodiments, an AN instance (e.g., NSSI AN-1) is dedicated to a single NSSI (e.g., NSSI A). Each Communication Service Instance can be supported by one or more NSIs. For example, the Communication Service Instance 1 is supported by NSI A, and the Communication Service Instance 2 can be supported by either NSI A or NSI B.

Privacy Protection in Network Slice as a Service (NSaaS)

With the implementation of network slicing, NSaaS can be offered by a service provider to its customers in the form of a service. This service allows a customer to use a network slice instance as an end user, or optionally allows a customer to manage a network slice instance as a manager via a management interface exposed by the telecommunications service provider. Currently, when NSaaS is offered, a telecommunications service provider focuses on properties that are related to service-level requirements, such as bandwidth, end-to-end latency, reliability, and/or QoS. User privacy protection, however, is becoming increasingly important in wireless communications. The security of personal and/or business information associated with mobile devices is of particular concern. For example, when users seek access with multiple carriers, availability of personally identifiable information across the different networks can lead to an increased risk of user profiling and/or information misuse. This patent document discloses techniques that can be implemented in various embodiments to provide user privacy protection as an NSaaS, offering different levels of anonymity on different network slices.

When a subscriber registers with its home network, the subscriber provides personally identifiable information to the home network, such as the subscriber's first name, the last name, and the address. Upon authenticating the subscriber, the home network assigns a mobile directory number (MDN) to the subscriber device—the telephone number associated that identifies the subscriber for subsequent traffic. The MDN is often included in the message headers. For example, the Session Initiation Protocol (SIP) messages include "From" and "To" headers that specify the telephone numbers. When the subscriber gains network access via different carriers, the inclusion of the MDN in message headers allows the tracing and/or tracking of the subscriber location(s) and/or call history by the carriers, leading to increased risk of privacy information leaks.

As part of the security measures, the subscriber device is provided a temporary identifier by the CN. For example, the 5G Global Unique Temporary Identifier (5G-GUTI) is a CN temporary identifier allocated by the AMF to the UE. A single 5G-GUTI can be used for accessing security context(s) within the AMF. The AMF can reassign new 5G-GUTI(s) when certain conditions are satisfied. However, the provision of the temporary identifier, such as 5G-GUTI, is limited to the CN and cannot be extended to a network slice or a Communication Service Instance that expands the AN, the TN, and the CN.

To remove the possibility of leaving a digital footprint across the networks, multiple pseudonymous identifiers can be generated for one or more Communication Services using a cryptographic protocol, such as the zero-knowledge protocol, so that traffic patterns cannot be traced to the same device based on a single unique identifier. The zero-knowledge protocol is a cryptographic protocol by which one party can prove to another party that a given statement is true while avoiding the conveyance of any additional information apart from the fact that the statement is indeed true. Using the zero-knowledge protocol, one or more unique pseudonymous identifiers can be generated randomly based on a private and public key pair that is associated with a subscriber's account data. The subscriber is then identified using different pseudonymous identifiers on different network slices, thereby minimizing the risk of user profiling based on the single identifier.

One specific implementation of the zero-knowledge protocol is the blockchain technology. A blockchain is a ledger to store cryptographically secured records. A blockchain network can have multiple users, each with one or more pseudonymous identities. A contract (also referred to as a smart contract) can be used to represent the interactions between the users and the ledger. The privacy service can be implemented as a chain that grants users network access after credential assertion and approval.

The blockchain network can rely on public key cryptography for transaction management. The blockchain can assign one or more unique pseudonymous addresses to the subscriber based on the hash of the subscriber's public key. The subscriber can relay its pseudonymous identifiers to the CN(s) when requesting network access. No one but the subscriber has access to its private key. After successful completion of the identity assertion process, the subscriber's personal information provided to the blockchain credential service is encrypted. The secret key used for encrypting the personal information is shared between the subscriber and the blockchain credential service (e.g., using Shamir's secret sharing scheme). The outcome of this transaction is hashed and sent to the blockchain for entry. The rules that govern access to a subscriber's data are defined in the contract.

Thus, any access or alteration to the personal information cannot happen without the consent of the subscriber. The use of the blockchain technology to manage pseudonymous identities enables the separation of the identity provider and the network operator.

Figure 5:
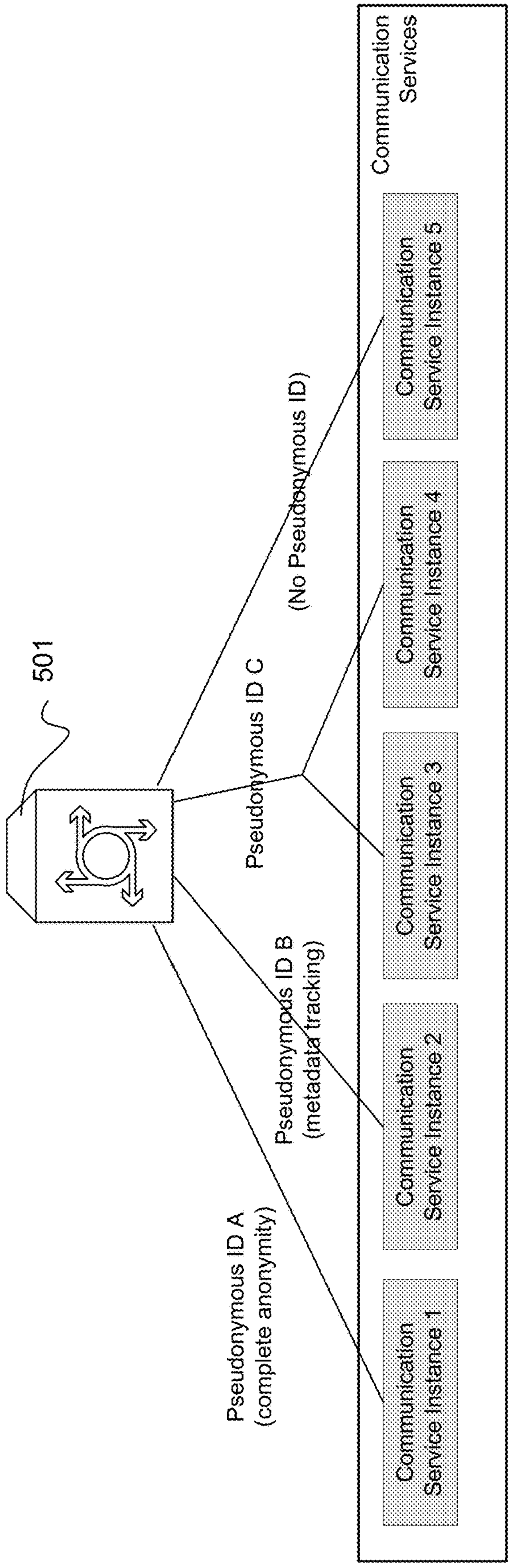
FIG. 5 illustrates an example credential service that is configured to generate pseudonymous identifiers (IDs) for communication service instances in accordance with one or more embodiments of the present technology.

FIG. 5 illustrates an example credential service 501 that is configured to generate pseudonymous IDs for different communication service instances in accordance with one or more embodiments of the present technology. As shown in FIG. 5, in some embodiments, each Communication Service Instance consumed by a subscriber can be assigned a separate pseudonymous ID (e.g., pseudonymous ID A for Communication Service Instance 1 and pseudonymous ID B for communication Service Instance 2). In some embodiments, the subscriber can choose to have complete anonymity in one or more network slices or one or more Communication Services (e.g., pseudonymous ID A for Communication Service Instance 1). In some embodiments, the subscriber can agree to a certain level of metadata tracking at the application or service-level. The subscriber's account data can include app-/service-specific metadata that allows tracking of the service-level activity without exposing too much personal data of the subscriber (e.g., pseudonymous ID B for Communication Service Instance 2).

In some embodiments, a pseudonymous ID can be associated with multiple communication service instances (e.g., pseudonymous ID C for Communication Service Instance 3 and 4). A subscriber can opt out of privacy protection in certain network slices and/or Communication Services (e.g., no pseudonymous ID for Communication Service Instance). The subscriber can be provided with flexible pricing options that are associated with different privacy protection levels. For example, a higher subscription fee can enable a higher level of privacy protection for subscribers who are sensitive to information sharing/leaks. Subscribers can also choose to share part of the usage information in exchange for a lower subscription fee.

In some embodiments, the credential service 501 shown in FIG. 5 can be implemented as part of the home network (e.g., in the AUSF). As discussed above, the use of proper cryptographic technology enables the separation of the credential service provider and the network service provider. For example, the credential service can be provided by a third-party trusted entity that satisfies the regulatory standards for managing user privacy data.

Figure 6:
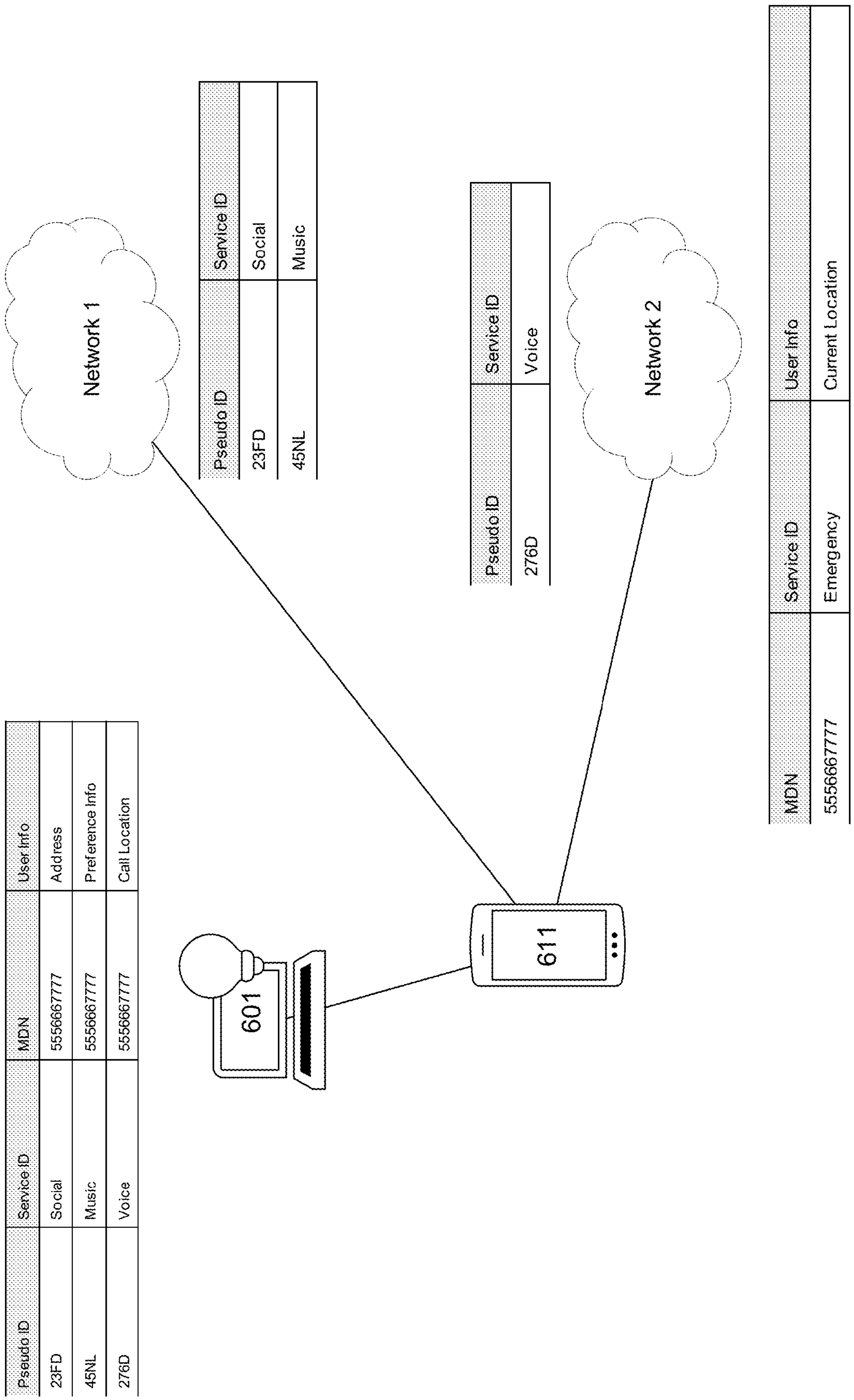
FIG. 6 illustrates an example configuration of a credential service in accordance with one or more embodiments of the present technology.

FIG. 6 illustrates an example configuration of a credential service 601 in accordance with one or more embodiments of the present technology. When a user 611 registers with an operator, the user 611 can be authenticated and authorized by the credential service 601 that is provided either by the operator or by a third-party trusted entity. User information, such as the contact address of the user and/or current location of the user, can be obtained and stored by the credential service 601. Additional subscription and/or pricing plan information, such as the level of desired privacy protection, can also be stored by the credential service 601. When the subscriber gains access to a network (e.g., Network 1, Network 2) to use a particular communication service, the credential service 601 can selectively generate a pseudonymous identifier for the service based on the subscription information. The pseudonymous identifier and its corresponding service identifier are visible to the network(s) or the network slice that provides the communication service. For example, the user 611 uses Network 1 (e.g., WiFi network) to listen to music and browse content on social media platforms. In this specific example, social media data exchange and music streaming are provided as two separate Communication Services having separate identifiers. Two separate pseudonymous identifiers are generated for the two services, respectively. The pseudonymous identifiers and service identifiers are visible to Network 1. However, absent additional information, tracing of the service-level activities and/or information based on the respective pseudonymous identifier cannot lead back to the user The subscription information can include additional metadata that indicates whether certain personal information, such as user preferences or current location, can be provided to the networks to enable user statistics collection for particular network slice(s). Using the disclosed technology, certain traffic can be made to traverse anonymous slices, whereas other traffic can traverse the regular network slices. For example, as shown in FIG. 6, traffic for emergency service traverses a network slice that does not provide any anonymity. The MDN is available to Network 2 for such service(s) so that critical information can be provided in a timely manner. Voice service, however, traverses a different network slice that provides a particular level of anonymity. The user 611 can use Network 2 (e.g., cellular network) to make voice calls. A pseudonymous identifier generated for the voice service/network slice becomes visible to Network 2, instead of the MDN. In some embodiments, the pseudonymous identifier can replace the MDN in the signaling headers so as to minimize the risk of user profiling. If the MDN of the user is needed (e.g., for caller ID display), Network 2 can obtain the MDN by querying the credential service 601 using the pseudonymous identifier.

Figure 7:
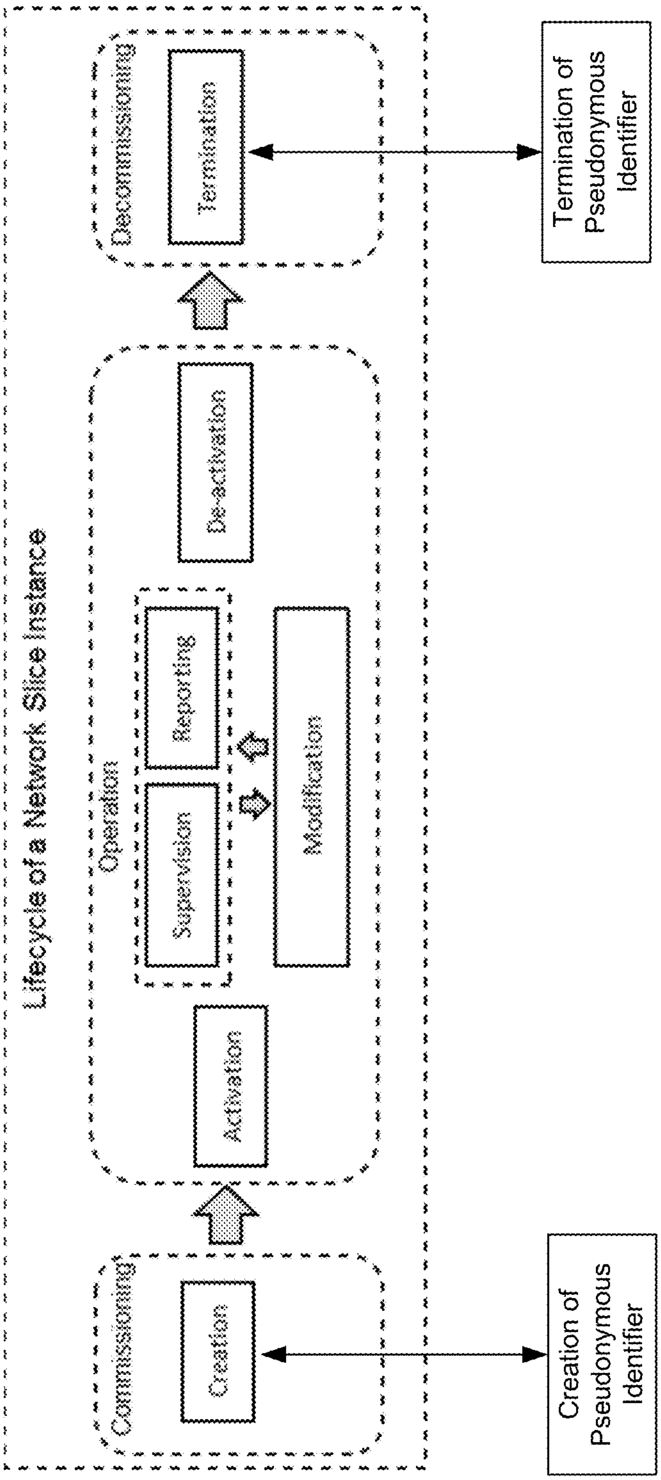
FIG. 7 is a flowchart representation of a method for wireless communication in accordance with one or more embodiments of the present technology.

In some embodiments, the pseudonymous identifiers are temporary identifiers based on the lifecycle of a network slice instance or a service session. FIG. 7 illustrates an example of creation and termination of a pseudonymous identifier in accordance with one or more embodiments of the present technology. As shown in FIG. 7, the creation and termination of the pseudonymous identifier can be associated with the creation and termination of the network slice instance. In some embodiments, the creation and termination of the pseudonymous identifier can be associated with the creation and termination of a service session corresponding to the network slice instance. For example, for different voice sessions associated with the voice network slice instance, the subscriber can be provided with a different pseudonymous identifier such that tracing of the call history cannot be performed based on the same pseudonymous identifier.

Figure 8:
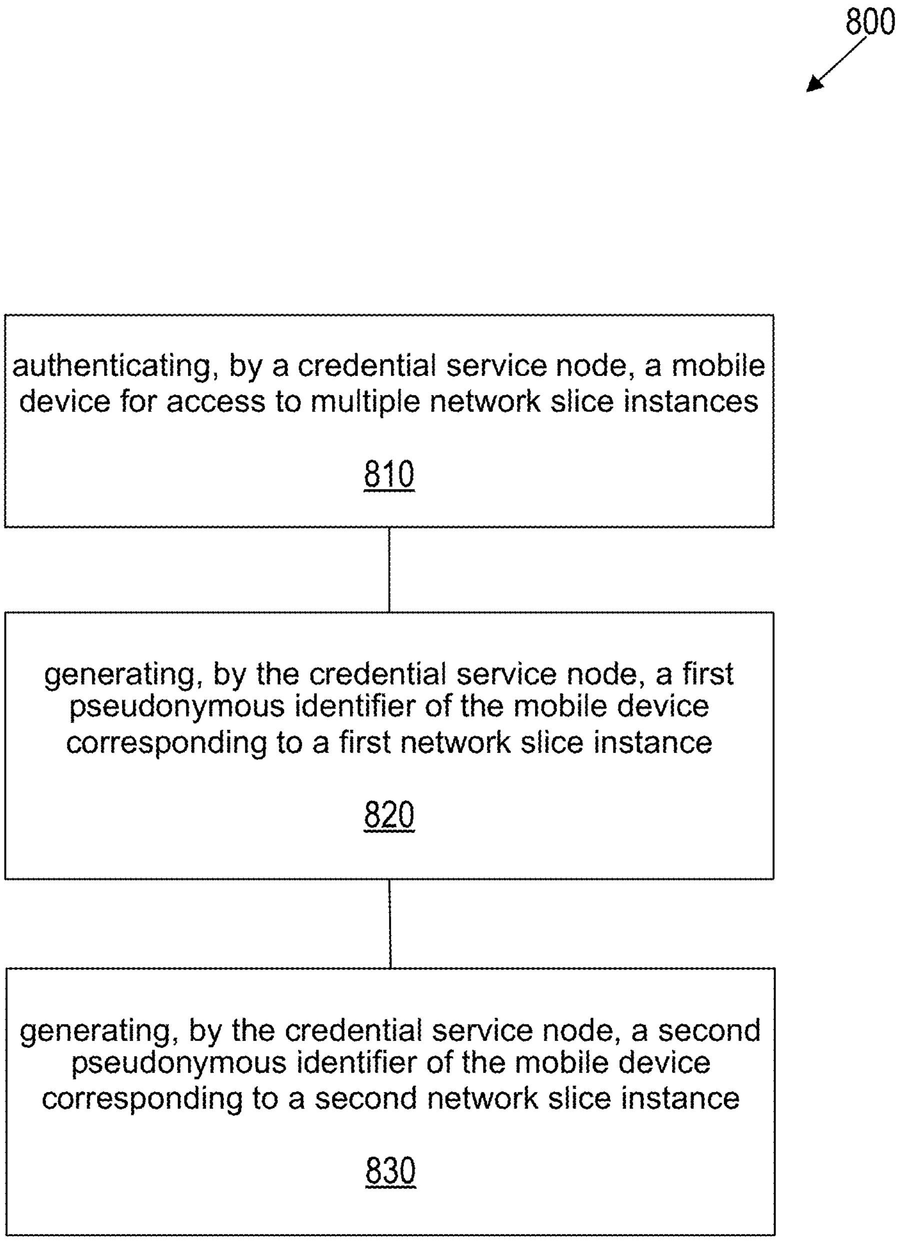
FIG. 8 is a flowchart representation of a method or a process for wireless communication in accordance with one or more embodiments of the present technology.

FIG. 8 is a flowchart representation of a method or a process 800 for wireless communication in accordance with one or more embodiments of the present technology. The process 800 includes, at operation 810, authenticating, by a credential service node, a mobile device for access to multiple network slice instances. Each of the multiple network slice instances corresponds to one or more of AN network functions and one or more CN network functions in a wireless communication network. The process 800 includes, at operation 820, generating, by the credential service node, a first pseudonymous identifier of the mobile device corresponding to a first network slice instance of the multiple network slice instances. The process 800 also includes, at operation 830, generating, by the credential service node, a second pseudonymous identifier of the mobile device corresponding to a second network slice instance of the multiple network slice instances, the second pseudonymous identifier being different than the first pseudonymous identifier.

In some embodiments, the wireless communication network is operated by a network operator, and the credential service node is provided by a trusted entity that is separated by the network operator.

The first pseudonymous identifier can be associated with a set of metadata associated with the mobile device to enable tracking of the set of metadata for the first network slice instance. In some embodiments, the process 800 comprises providing a mobile directory number of the mobile device for traffic associated with a third network slice instance (e.g., emergency service/network slice).

The first pseudonymous identifier or the second pseudonymous identifier can be a temporary identifier that is associated with a lifecycle of the first network slice instance or the second network slice instance. The credential service node can be implemented as a blockchain based on a public key and a private key associated with user data of the mobile device.

Figure 9:
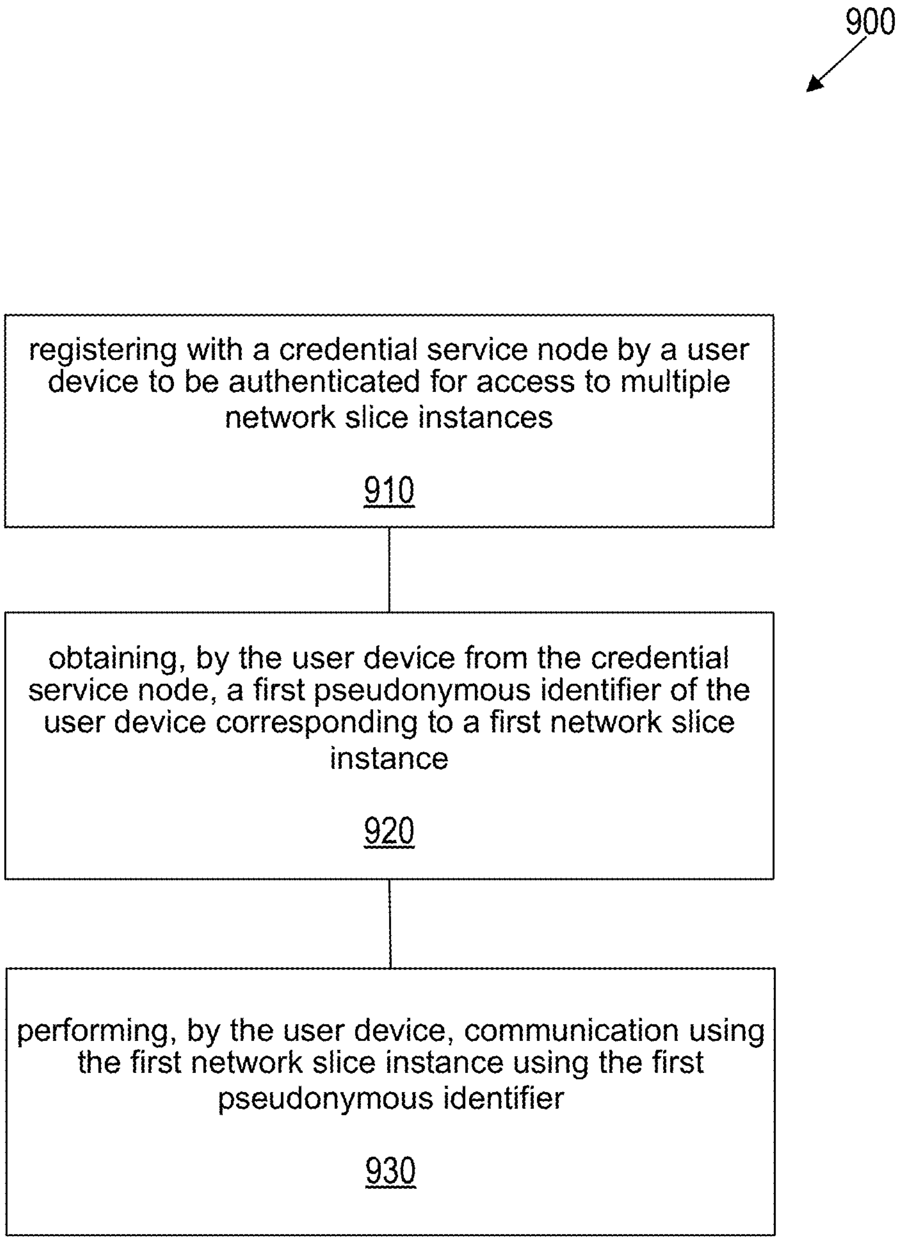
FIG. 9 is a flowchart representation of another method or a process for wireless communication in accordance with one or more embodiments of the present technology.

FIG. 9 is a flowchart representation of a method or a process 900 for wireless communication in accordance with one or more embodiments of the present technology. The process 900 includes, at operation 910, registering with a credential service node by a user device to be authenticated for access to multiple network slice instances. Each of the multiple network slice instances corresponds to one or more of AN network functions and one or more CN network functions in a wireless communication network. The process 900 includes, at operation 920, obtaining, by the user device from the credential service node, a first pseudonymous identifier of the user device corresponding to a first network slice instance of the multiple network slice instances. The process 900 also includes, at operation 930, performing, by the user device, communication using the first network slice instance using the first pseudonymous identifier.

In some embodiments, the first pseudonymous identifier is associated with a set of metadata associated with the user device to enable tracking of the set of metadata for the first network slice instance. In some embodiments, the first pseudonymous identifier is generated based on a public key and/or a private key associated with user information or user data.

The process 900 can further comprise obtaining, by the user device from the credential service node, a second pseudonymous identifier of the user device corresponding to a second network slice instance of the multiple network slice instances, and performing, by the user device, communication using the second network slice instance using the second pseudonymous identifier. The second pseudonymous identifier is different than the first pseudonymous identifier. The process 900 further comprises subscribing to different pricing plans by the user device for usage of the first pseudonymous identifier for the first network slice instance and usage of the second pseudonymous identifier for the second network slice instance. The first pseudonymous identifier or the second pseudonymous identifier can be a temporary identifier that is associated with a lifecycle of the first network slice instance or the second network slice instance.

In some embodiments, the process comprises performing, by the user device, communication using a third network slice instance using a mobile directory number of the user device, instead of a pseudonymous identifier. For example, tracking of the user information may be desirable for some specific network slices, such as the emergency service network slice. The real or permanent identifier can be provided for such services to enable the accurate tracking of the subscribers.

Computer System

Figure 10:
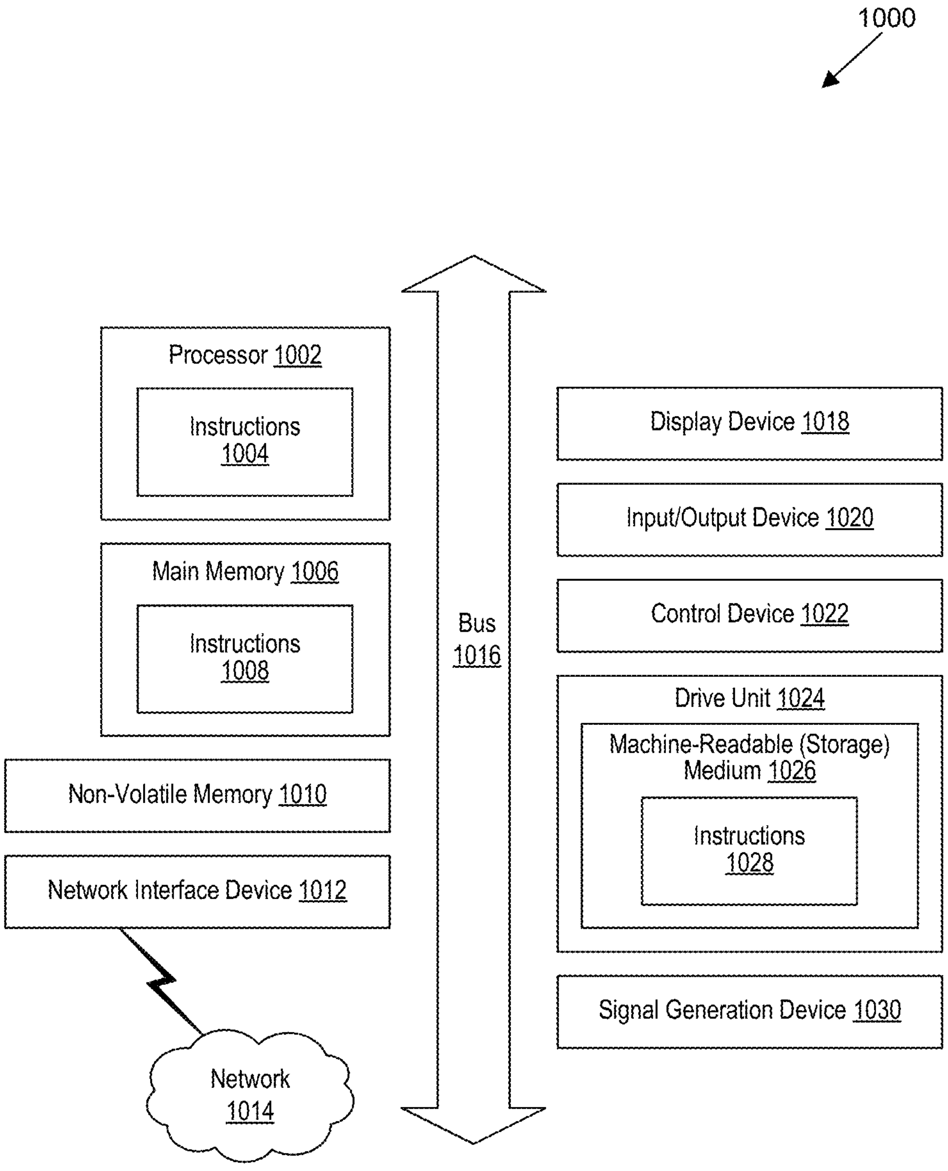
FIG. 10 is a block diagram that illustrates components of a computing device.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components, illustrated or described relative to the examples of the figures and any other components described in this specification, can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementation, the computer system 1000 can be an embedded computer system, a system-on-chip (SOC), a single-board computer system (SBC) or a distributed system, such as a mesh of computer systems, or include one or more cloud components in one or more networks. Where appropriate, one or more computer systems 1000 can perform operations in real-time, near real-time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media, such as volatile and non-volatile memory devices 1010, removable flash memory, hard disk drives, optical disks, and transmission-type media, such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A wireless communication system, comprising:

at least one core network node comprising one or more processors;

at least one access network node in communication with the at least one core network node, wherein the at least one access network node comprises one or more processors, wherein the at least one core network node and the at least one access network node are configured to provide transport network connectivity to a mobile device having a mobile directory number associated therewith for access to multiple network slice instances; and a credential service node comprising one or more processors, the credential service node configured to:

authenticate the mobile device for the access to the multiple network slice instances, and provide anonymity to the mobile device by generating a first pseudonymous identifier of the mobile device for a first network slice instance of the multiple network slice instances and a second pseudonymous identifier of the mobile device for a second network slice instance of the multiple network slice instances, wherein the second pseudonymous identifier is different than the first pseudonymous identifier, wherein the first pseudonymous identifier is used in place of the mobile directory number for communications associated with the first network slice instance, wherein the second pseudonymous identifier is used in place of the mobile directory number for communications associated with the second network slice instance, wherein the first pseudonymous identifier is associated with a first level of anonymity, wherein the second pseudonymous identifier is associated with a second level of anonymity, the second level different from the first level, wherein the first pseudonymous identifier does not include the mobile directory number, wherein the second pseudonymous identifier does not include the mobile directory number, wherein the first pseudonymous identifier cannot be determined to be associated with a user of the mobile device without additional information, wherein the second pseudonymous identifier cannot be determined to be associated with the user of the mobile device without additional information, wherein the first pseudonymous identifier and the second pseudonymous identifier are generated based at least in part on subscription information comprising a level of desired privacy protection.

2. The wireless communication system of claim 1, wherein the first pseudonymous identifier is associated with a set of metadata associated with the mobile device to enable tracking of the set of metadata for the first network slice instance.

3. The wireless communication system of claim 2, wherein usage of the first pseudonymous identifier for the first network slice instance and usage of the second pseudonymous identifier for the second network slice instance are associated with different pricing plans.

4. The wireless communication system of claim 1, wherein the credential service node is configured to provide a mobile directory number of the mobile device for traffic associated with a third network slice instance of the multiple network slice instances.

5. The wireless communication system of claim 1, wherein the first pseudonymous identifier or the second pseudonymous identifier is a temporary identifier that is associated with a lifecycle of the first network slice instance or the second network slice instance respectively.

6. The wireless communication system of claim 1, wherein the credential service node is implemented as a blockchain based on a public key and a private key associated with user data of the mobile device.

7. The wireless communication system of claim 1, wherein the credential service node is part of an Authentication Server Function (AUSF) of the wireless communication system.

8. A method for wireless communication, comprising:

authenticating, by a credential service node, a mobile device having a mobile directory number associated therewith for access to multiple network slice instances, wherein each network slice instance of the multiple network slice instances corresponds to one or more of access network network functions and one or more core network network functions in a wireless communication network;

generating, by the credential service node, a first pseudonymous identifier of the mobile device corresponding to a first network slice instance of the multiple network slice instances; and generating, by the credential service node, a second pseudonymous identifier of the mobile device corresponding to a second network slice instance of the multiple network slice instances, the second pseudonymous identifier being different than the first pseudonymous identifier, wherein the first pseudonymous identifier is different from the second pseudonymous identifier, wherein the first pseudonymous identifier is used in place of the mobile directory number for communications associated with the first network slice instance, wherein the second pseudonymous identifier is used in place of the mobile directory number for communications associated with the second network slice instance, wherein the first pseudonymous identifier is associated with a first level of anonymity, wherein the second pseudonymous identifier is associated with a second level of anonymity, the second level different from the first level, wherein the first pseudonymous identifier does not include the mobile directory number, wherein the second pseudonymous identifier does not include the mobile directory number, wherein the first pseudonymous identifier cannot be determined to be associated with a user of the mobile device without additional information, wherein the second pseudonymous identifier cannot be determined to be associated with the user of the mobile device without additional information, wherein the first pseudonymous identifier and the second pseudonymous identifier are generated based at least in part on subscription information comprising a level of desired privacy protection.

9. The method of claim 8, wherein the wireless communication network is operated by a network operator, and wherein the credential service node is provided by a trusted entity that is separated by the network operator.

10. The method of claim 8, wherein the first pseudonymous identifier is associated with a set of metadata associated with the mobile device to enable tracking of the set of metadata for the first network slice instance.

11. The method of claim 8, further comprising:

providing a mobile directory number of the mobile device for traffic associated with a third network slice instance of the multiple network slice instances.

12. The method of claim 8, wherein the first pseudonymous identifier or the second pseudonymous identifier is a temporary identifier that is associated with a lifecycle of the first network slice instance or the second network slice instance.

13. The method of claim 8, wherein the credential service node is implemented as a blockchain based on a public key and a private key associated with user data of the mobile device.

14. A method for wireless communication, comprising:

registering with a credential service node by a user device having a mobile directory number associated therewith to be authenticated for access to multiple network slice instances, wherein each of the multiple network slice instances corresponds to one or more of access network functions and one or more core network functions in a wireless communication network;

obtaining, by the user device from the credential service node, a first pseudonymous identifier of the user device corresponding to a first network slice instance of the multiple network slice instances;

performing, by the user device, communication using the first network slice instance using the first pseudonymous identifier, obtaining, by the user device from the credential service node, a second pseudonymous identifier of the user device corresponding to a second network slice instance of the multiple network slice instances, the second pseudonymous identifier being different than the first pseudonymous identifier; and performing, by the user device, communication using the second network slice instance using the second pseudonymous identifier, wherein the first pseudonymous identifier is different from the second pseudonymous identifier, wherein the first pseudonymous identifier is used in place of the mobile directory number for communications associated with the first network slice instance, wherein the second pseudonymous identifier is used in place of the mobile directory number for communications associated with the second network slice instance, wherein the first pseudonymous identifier is associated with a first level of anonymity, wherein the second pseudonymous identifier is associated with a second level of anonymity, the second level different from the first level, wherein the first pseudonymous identifier does not include the mobile directory number, wherein the second pseudonymous identifier does not include the mobile directory number, wherein the first pseudonymous identifier cannot be determined to be associated with a user of the mobile device without additional information, wherein the second pseudonymous identifier cannot be determined to be associated with the user of the mobile device without additional information, wherein the first pseudonymous identifier and the second pseudonymous identifier are generated based at least in part on subscription information comprising a level of desired privacy protection.

15. The method of claim 14, wherein the first pseudonymous identifier is associated with a set of metadata associated with the user device to enable tracking of the set of metadata for the first network slice instance.

16. The method of claim 14, further comprising:

subscribing to different pricing plans by the user device for usage of the first pseudonymous identifier for the first network slice instance and usage of the second pseudonymous identifier for the second network slice instance.

17. The method of claim 14, wherein the first pseudonymous identifier or the second pseudonymous identifier is a temporary identifier that is associated with a lifecycle of the first network slice instance or the second network slice instance.

18. The method of claim 14, further comprising:

performing, by the user device, communication using a third network slice instance using a mobile directory number of the user device.

19. The method of claim 14, wherein the first pseudonymous identifier is generated based on a public key or a private key associated with user information.

20. The method of claim 14, wherein the credential service node is implemented as a blockchain based on a public key and a private key associated with user data of the user device.

* * * * *